UNITED STATES PATENT OFFICE.

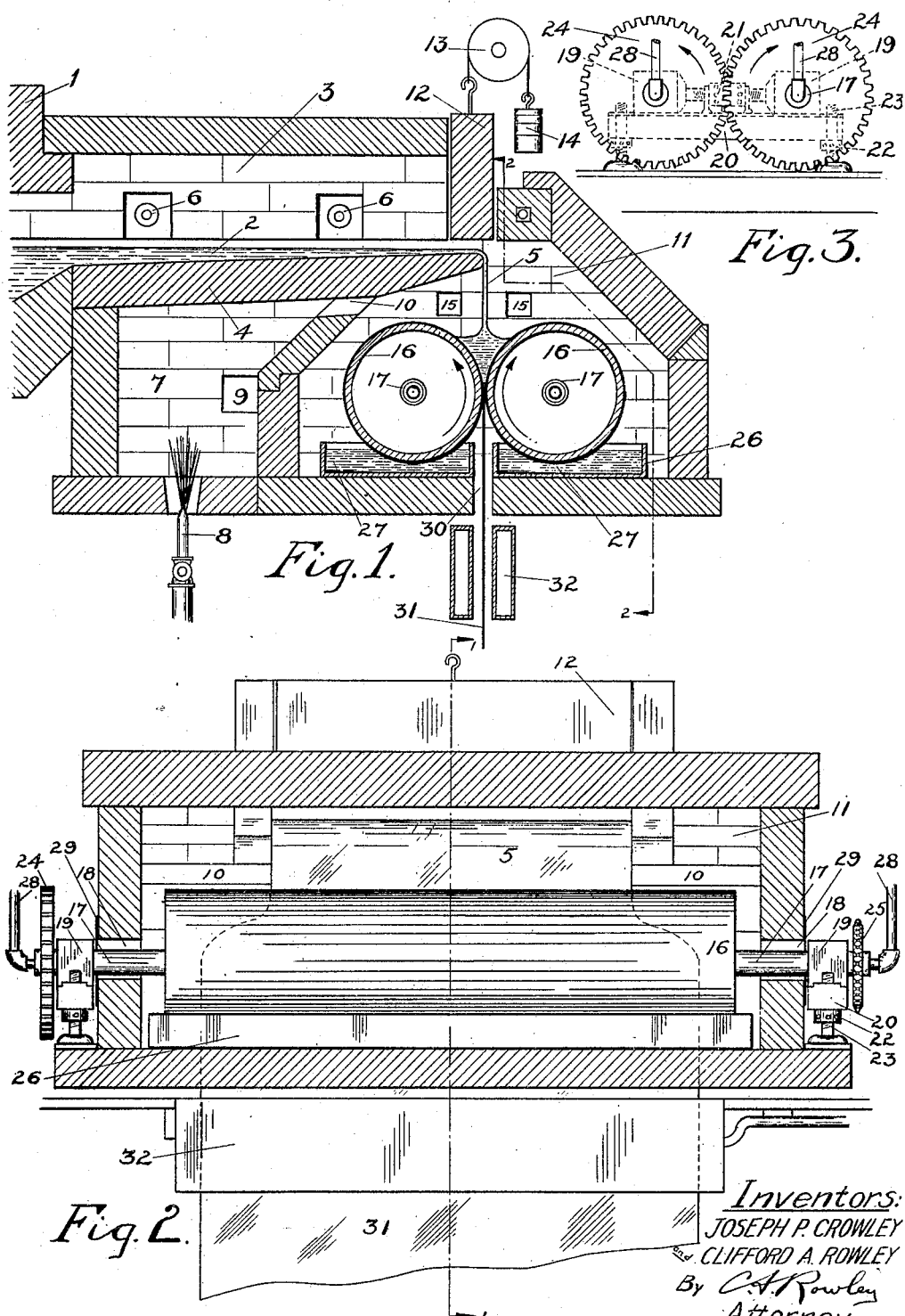

JOSEPH P. CROWLEY AND CLIFFORD A. ROWLEY, OF TOLEDO, OHIO, ASSIGNORS TO THE LIBBEY-OWENS SHEET GLASS COMPANY, OF TOLEDO, OHIO, A CORPORATION OF OHIO.

METHOD AND APPARATUS FOR PRODUCING SHEET GLASS.

1,422,036.          Specification of Letters Patent.      Patented July 4, 1922.

Application filed January 17, 1921. Serial No. 437,660.

*To all whom it may concern:*

Be it known that we, JOSEPH P. CROWLEY and CLIFFORD A. ROWLEY, citizens of the United States, residing at Toledo, in the county of Lucas and State of Ohio, have invented new and useful Improvements in Methods and Apparatus for Producing Sheet Glass, of which the following is a specification.

This invention discloses a new system of producing sheet glass. One of the simplest and earliest conceived methods of producing sheet glass was to force the molten glass through a slot or aperture, conforming to the width and thickness of the sheet desired, but such methods have never proven successful, as the sheets so produced are invariably marred and scratched by the walls of the aperture, which cannot be kept clear and smooth, and the aperture soon becomes clogged and filled up with "dog-metal" or devitrified glass.

An object of the present invention is to disclose an apparatus, in which the walls of the slot through which the molten glass is flowed to form the sheet are constantly changing to provide a clean smooth surface, and wherein the slot sides are coated with soft molten tin or other similar material, which will not mar the sheet or allow the formation of dog-metal at the slot.

Other objects and advantages of the invention will become apparent as the detailed description proceeds.

In the accompanying drawings:

Fig. 1 is a vertical longitudinal central section through the apparatus, taken substantially on the line 1—1 of Fig. 2.

Fig. 2 is a vertical transverse section, taken substantially on the line 2—2 of Fig. 1.

Fig. 3 is a detail end elevation of the mounting for one end of the rollers, looking from the left-hand side of Fig. 2.

At 1 is indicated the discharge end of a continuous tank furnace, from which molten glass 2, flows out through heated chamber 3, over an inclined slab 4, spilling over the nose of this slab in a thin stream 5. The chamber 3 is heated by suitable burners 6, and a heating chamber 7 below the slab 4, is heated by burner 8. Draft for the burner 8 is obtained through the flue 9, and heated gases from the chamber 8 also pass out through the upper passage 10, under the end of slab 4, into the sheet forming chamber 11, presently to be described. A shear cake 12, suspended from pulleys 13, and counterbalanced by weights 14, serves to cut off the supply of molten glass when necessary, and also to regulate the passage of heated gases from chamber 3 into chamber 11. Flues 15, allow for the outward passages of gases from chamber 11.

In the chamber 11 are arranged a pair of similar metallic cylinders or rollers 16, which are mounted on parallel horizontal shafts 17, which extend out through openings 18 in the end walls of chamber 11, and are rotatably mounted in bearing boxes 19. The two bearings 19, at each end of the pair of shafts, are slidably mounted on a supporting block 20, and are adjustable toward and from one another by means of the screw and turnbuckle mechanism indicated at 21. Each end of the block 20 rests on an adjustable nut 22, carried by a vertical screw 23. By means of the devices just described, or equivalent mechanisms, the two rollers 16 may be adjusted both horizontally, to vary the width of the slot or aperture formed between their contiguous cylindrical surfaces, and also vertically, to raise them into or out of the baths of molten tin, or other substance, presently to be described. The two rollers are caused to rotate in unison, but in opposite directions, by means of the intermeshing gears 24, one of which is secured to each shaft 17. The pair of rollers receive driving power from any suitable motor mechanism, a sprocket wheel 25 for receiving this drive being indicated at the right of Fig. 2. Each roller 16 is internally cooled by air, water or other fluid passing in through the pipe connections indicated conventionally at 28.

The outer cylindrical surface of each roller 16 is heavily coated with a soft metal such as tin or lead. This well-known process, usually referred to as "tinning," is the same as is employed in producing the common tin-plate. The iron or other metal to be tinned is first treated with a suitable acid, and is then dipped into a bath of the molten tin or lead. The dipping is repeated until the desired coating is obtained. The layer of tin adheres integrally to the base-metal, as in the common process of "soft-soldering," and does not readily burn off, even though subjected to a temperature sufficient to melt the softer surface metal, and especially if the tinned member is internally cooled as in the present instance.

Continual subjection to an intense heat will, however, melt or wear away the layer of tin, and means are here provided to constantly maintain and replenish this surface metal. Below each roller 16, is mounted a receptacle 26, holding a bath of molten tin or lead 27, through which the lower portion of the cylindrical surface of the roller passes. The temperature of the chamber 11 is normally much higher than the melting point of tin or lead so that no additional heating means are necessary to keep these baths molten. The roller is internally cooled to such a degree that the tinned surface cannot be entirely melted away, although the outer surface may be somewhat melted by the contacting hot glass. As the roller passes through the molten bath of tin, more molten metal will be picked up to renew the coating, so that a clear smooth surface coating of tin or lead is constantly maintained. If necessary or desirable at any time, the rollers can be elevated out of the molten baths by means of the screw and nut mechanisms 22 and 23.

Suitable cover plates 29, surround the shafts 17 at each end to close the openings 18. In the bottom of chamber 11, in line with the slot between the rollers 16, is a slot or opening 30, through which the sheet of glass 31 passes down out of the apparatus, and a pair of coolers 32, through which water or other cooling fluid circulates, may be arranged at the two sides of the sheet to accelerate the cooling and setting of the sheet.

In operation, the two cylinders 16 are slowly rotated, preferably against the direction of flow of the glass, as shown by the arrows, in Fig. 1. The molten glass, in a highly heated and very fluid condition, is allowed to flow over the slab 4 in a thin stream 5, and falls into the trough or hopper formed by the adjacent faces of the rollers 16. The accumulation of molten glass in this trough will flow out somewhat toward the ends of the rollers as indicated in dotted lines in Fig. 2, so that the resultant sheet of glass that flows down through the slot formed by the contiguous face portions of the rollers, is wider than the flow of glass 5, from the molten source. The rollers 16 are made sufficiently long to allow for this sidewise flow. The smooth soft molten metal surface on the rollers, does not mar or injure the surfaces of the sheet formed by the glass flow between the rollers, and the slowly rotating rollers present constantly fresh surfaces at the two sides of the slot. The rollers 16 are maintained at a relatively low temperature by the internal cooling means, so that they exert a cooling and setting influence on the flowing molten glass. Also the tinned surface of the cooled roller has an opportunity to become somewhat set again while passing through the relatively large arc portion when it is out of engagement with the molten glass. The roller then passes through the pool of molten tin, wherein its surface becomes recoated, polished and smoothed out by the passage through the molten metal, so that a smooth clean surface, having a surface film of molten tin is again presented to the flow of molten glass, as it passes through the slotted aperture between the rollers. After leaving the rollers the sheet 31 passes directly out of the chamber 11, through slot 30, where it is cooled and set by the atmosphere, aided if necessary by the coolers 32. Any suitable apparatus may be provided to handle the finished sheet after it has passed out of the apparatus.

It is to be understood that throughout this description and the following claims, wherever tin or a tinned surface is referred to, the terms are intended to comprehend the use of lead or other analogous metals or materials, which are known to act the same or in a similar manner when applied to a treated metallic surface, as already described.

Claims:

1. The method of producing sheet glass, by flowing molten glass between surfaces coated with molten metal.

2. The method of producing sheet glass by flowing molten glass between surfaces coated with molten tin.

3. The method of producing sheet glass by flowing molten glass between moving surfaces coated with molten metal.

4. The method of producing sheet glass by flowing molten glass between upwardly moving surfaces coated with molten metal.

5. The method of producing sheet glass by flowing molten glass between moving surfaces coated with molten tin.

6. An apparatus for producing sheet glass, comprising a slotted hopper, lined with molten tin, through which the molten glass flows to form the sheet.

7. An apparatus for producing sheet glass by flowing molten glass downwardly, comprising a trough or hopper having a discharge opening in the form of a slot, and means for maintaining the walls of the slot coated with molten tin.

8. An apparatus for producing sheet glass, comprising a slotted hopper lined with molten tin, through which the molten glass flows to form the sheet, and means for renewing the tin lining of the hopper.

9. An apparatus for producing sheet glass, comprising a slotted hopper lined with molten tin, through which the molten glass flows to form the sheet, means for internally cooling the walls of the hopper, and a heated chamber in which the hopper is located.

10. An apparatus for producing sheet glass by flowing molten glass through a slot, comprising a pair of moving members forming the side walls of the slot, having their glass engaging surfaces coated with molten metal.

11. An apparatus for producing sheet glass by flowing molten glass downwardly through a slot, comprising a pair of moving members forming the side walls of the slot, having their glass engaging surfaces coated with molten tin.

12. An apparatus for producing sheet glass by flowing molten glass downwardly through a slot, comprising a pair of upwardly rotating members forming the side walls of the slot, having their glass engaging surfaces coated with molten metal.

13. An apparatus for producing sheet glass by flowing molten glass downwardly through a slot, comprising a pair of rotating members forming the side walls of the slot, having their glass engaging surfaces coated with molten tin.

14. An apparatus for producing sheet glass by flowing molten glass downwardly through a slot, comprising a pair of rotating members forming the side walls of the slot, having their glass engaging surfaces coated with molten tin, and means for internally cooling the rotating members.

15. An apparatus for producing sheet glass by flowing molten glass downwardly through a slot, comprising a pair of rotating members forming the side walls of the slot, having their glass engaging surfaces coated with molten tin, means for internally cooling the rotating members, and a heated chamber in which the members are confined.

16. An apparatus for producing sheet glass, comprising a pair of moving members having contiguous parallel surfaces forming a narrow slot between the members, the surfaces being coated with molten tin, and means for flowing molten glass through this slot.

17. An apparatus for producing sheet glass, comprising a pair of metallic rollers having tinned outed surfaces, between which molten glass flows to form the sheet.

18. An apparatus for producing sheet glass, comprising a pair of metallic rollers having tinned outer surfaces, between which molten glass flows to form the sheet, the rollers being rotated against the direction of flow of the glass.

19. An apparatus for producing sheet glass, comprising a pair of metallic rollers having tinned outer surfaces, between which molten glass flows to form the sheet, means for rotating the rollers, and means to internally cool the rollers.

20. An apparatus for producing sheet glass, comprising a pair of metallic rollers having tinned outer surfaces, between which molten glass flows to form the sheet, means for internally cooling the rollers, and a heated chamber in which the rollers are confined.

21. In an apparatus for continuously producing sheet glass, a source of molten glass, a pair of parallel horizontal rollers having their cylindrical surfaces tinned, means for renewing these tinned surfaces, means for adjusting the rollers, means for rotating the rollers, means for flowing molten glass from the source into the trough formed by the rollers, the glass flowing through the slot formed by the contiguous tinned surfaces of the rollers, and means for cooling the sheet as it passes down from the rollers.

22. In an apparatus for continuously producing sheet glass, a source of molten glass, a pair of parallel horizontal metallic rollers having their cylindrical surfaces tinned, mounted so that their adjacent surfaces are separated a distance substantially equal to the thickness of the sheet of glass to be produced, means for adjusting the separation of the rollers, means for rotating the rollers in opposite directions, and means for flowing the molten glass into the trough formed by the rollers, the glass flowing down through the slot formed by the contiguous surfaces of the rollers and emerging as a sheet of glass.

23. In an apparatus for continuously producing sheet glass, a source of molten glass, a pair of parallel horizontal cylindrical metallic rollers, having their cylindrical surfaces tinned, mounted so that their contiguous surfaces are separated a distance substantially equal to the thickness of the sheet of glass to be produced, means for adjusting the rollers vertically and horizontally, means for cooling the rollers, means for rotating the rollers in opposite directions, a receptacle containing molten tin in which the lower portion of each roller revolves, means for flowing the molten glass from the source into the trough formed by the adjacent rollers, the glass flowing through the slot formed by the contiguous surfaces of the rollers and emerging in the form of a glass sheet.

24. In an apparatus for continuously producing sheet glass, a source of molten glass, a pair of parallel horizontal cylindrical metallic rollers having their cylindrical surfaces tinned, mounted so that their contiguous surfaces are separated a distance substantially equal to the thickness of the sheet of glass to be produced, means for adjusting the rollers vertically and horizontally, means for internally cooling the rollers, means for rotating the rollers in opposite directions, a receptacle containing molten tin in which the lower portion of each roller revolves, means for flowing the molten glass from the source into the trough formed by the pair of rollers, the glass flowing through the slot formed by the contiguous surfaces of the moving rollers and emerging in the form of a downwardly moving sheet of glass, and means for cooling and setting this sheet.

25. In an apparatus for continuously producing sheet glass, a source of molten glass, a pair of horizontal cylindrical metallic rollers having their cylindrical surfaces tinned, means for adjusting the rollers vertically and toward and from each other, means for internally cooling the rollers, means for rotating the rollers in opposite directions, a receptacle containing molten tin in which the lower portion of each roller revolves, means for flowing molten glass from the source into the trough between the rollers, the glass flowing through the slot formed by the contiguous surfaces of the rollers and emerging in the form of a downwardly moving sheet of glass, a heated chamber in which the rollers are located, having a slot in its lower side, and means for cooling the sheet as it emerges from the chamber.

Signed at Toledo, in the county of Lucas and State of Ohio, this 15th day of January, 1921.

JOSEPH P. CROWLEY.
CLIFFORD A. ROWLEY.